United States Patent [19]
Hurst et al.

[11] 3,835,214
[45] Sept. 10, 1974

[54] OXIDATIVE STRIPPING PROCESS FOR THE RECOVERY OF URANIUM FROM WET-PROCESS PHOSPHORIC ACID

[75] Inventors: Fred J. Hurst; David J. Crouse, both of Oak Ridge, Tenn.

[73] Assignee: The United States of America as represented by the United States Atomic Energy Commission, Washington, D.C.

[22] Filed: Aug. 15, 1972

[21] Appl. No.: 280,922

[52] U.S. Cl. ............ 423/10, 423/15, 423/18, 423/20, 423/260, 23/312 P, 23/312 ME
[51] Int. Cl. ............ B01d 11/00, C01g 56/00
[58] Field of Search ......... 423/10, 15, 18, 20, 260; 23/312 P, 312 ME

[56] References Cited
UNITED STATES PATENTS

| | | | |
|---|---|---|---|
| 2,830,872 | 4/1958 | McCullough | 423/10 |
| 2,859,092 | 11/1958 | Bailes et al. | 423/10 X |
| 3,030,175 | 4/1962 | Magner et al. | 423/10 |
| 3,034,854 | 5/1962 | Peppard et al. | 423/10 |
| 3,052,513 | 9/1962 | Crouse | 423/10 X |
| 3,052,514 | 9/1962 | Schmitt | 423/10 |
| 3,711,591 | 1/1973 | Hurst et al. | 423/10 |

*Primary Examiner*—Benjamin R. Padgett
*Assistant Examiner*—R. L. Tate
*Attorney, Agent, or Firm*—John A. Horan; David S. Zachry; Irving Barrack

[57] ABSTRACT

A process for the recovery of uranium from a wet-process type phosphoric acid solution is effected by adjusting said solution with sufficient ferrous ion to insure that the uranium is in the uranous form, contacting the adjusted solution with an organic phase consisting essentially of a mono and disubstituted phenyl ester of orthophosphoric acid dissolved in an inert diluent to effect transfer of the uranium into the organic phase, stripping the uranium from the organic phase with a 6–12 M phosphoric acid solution containing an oxidizing agent to produce a uranyl phosphate strip solution more highly concentrated in uranium than the wet-process feed solution.

1 Claim, 1 Drawing Figure

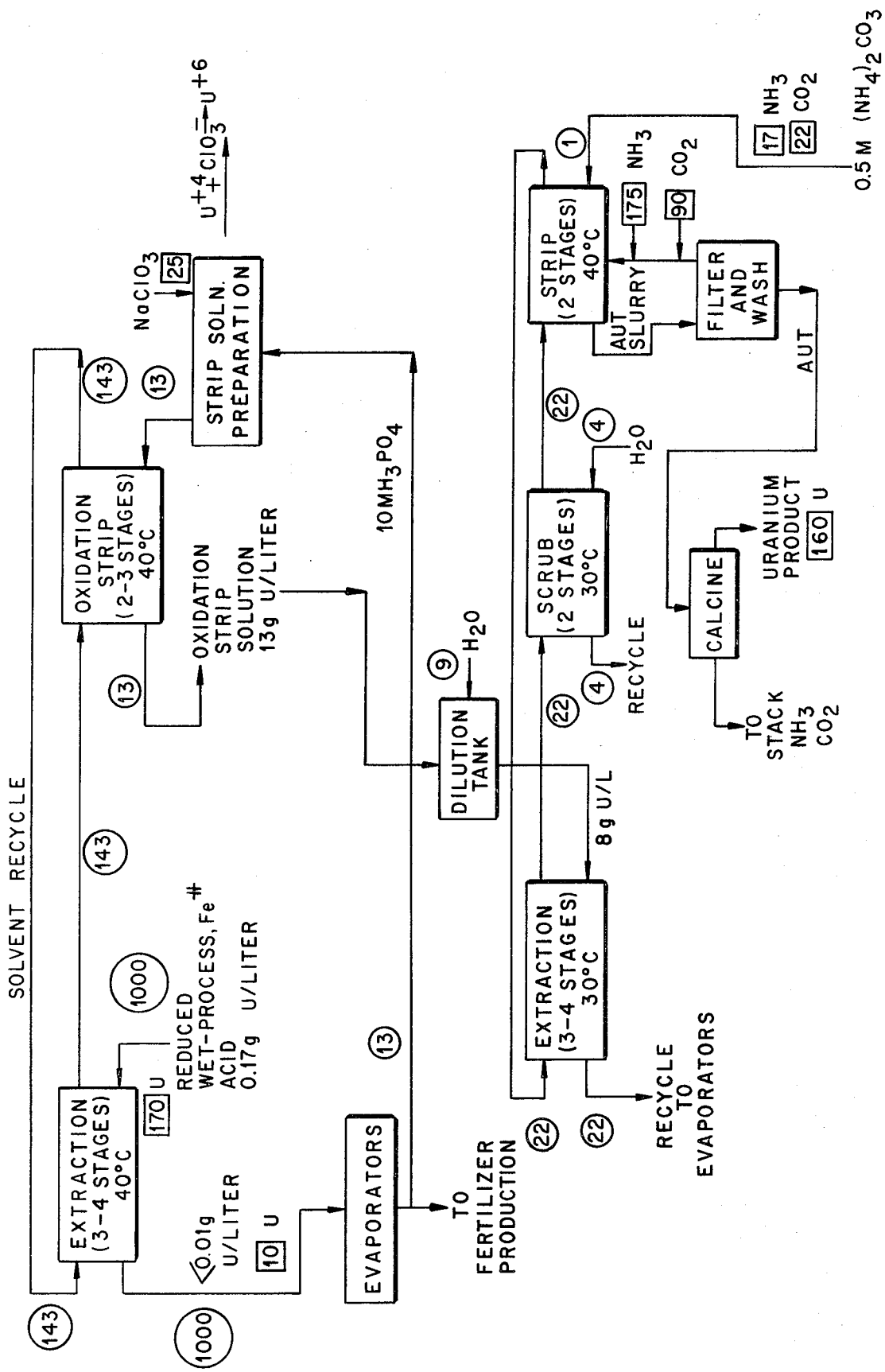

OXIDATIVE STRIPPING PROCESS FOR THE RECOVERY OF URANIUM FROM WET-PROCESS PHOSPHORIC ACID

BACKGROUND OF THE INVENTION

The invention described herein was made in the course of, or under, a contract with the U.S. Atomic Energy Commission.

The present invention relates to an improved process for the recovery of uranium as a by-product of phosphate fertilizer production. More particularly, it relates to a process for the recovery of uranium from the wet-process phosphoric acid that is produced in the treatment of phosphate rock found in Florida and other states of the United States and in several foreign countries.

The main purpose in mining phosphate rock is to process it to a high phosphate-containing fertilizer product. The first step in winning the phosphate from the rock consists of digestion with sulfuric acid under controlled temperature and concentration conditions to produce a phosphoric acid solution and an insoluble calcium sulfate (gypsum). Prior to further treatment to produce a commercially acceptable fertilizer product, this phosphate solution can be processed to remove valuable uranium values provided such processing is economically justified.

It is accordingly an object of this invention to provide a process for the recovery of uranium values from uraniferous phosphate mined deposits that satisfies this criterion.

The phosphate rock mined in Florida contains 0.01 to 0.02 weight percent uranium or from 0.2 to 0.4 pound of uranium per mined ton. While this appears to be a relatively small concentration, it represents a large supply of uranium because of the large amount of phosphate rock processed. For example, it has been recently estimated that the yearly amount of Florida phosphate rock processed contains about 2,000 tons of $U_3O_8$ dissolved therein, representing a significant potential source of uranium.

The so-called "wet-process" phosphoric acid solution resulting from the acidulation of phosphate rock has the following approximate analysis (concentration in grams per liter): 600 $H_3PO_4$, 0.17 uranium, 9 iron, 1 calcium, 30 sulfate, and 27 fluorine. This solution can serve as the aqueous feed for a liquid-liquid solvent extraction process for uranium recovery. In recent years, workers have demonstrated the technical feasibility of solvent extraction as a way to recover uranium from wet-process phosphoric acid. Technical feasibility alone is, however, a necessary but insufficient criterion for a successful process. It must, in addition, be combined with high process efficiency to be considered as a commercially useful process. Since uranium recovery is a by-product process of the commercial phosphoric acid process, it is clear that the uranium recovery must occur with minimum disruption of the commercial phosphoric acid manufacturing process and that such recovery proceed with a minimum number of process steps utilizing a minimum amount of reagents to recover the uranium as a purified uranium oxide product. It is therefore a principal object of the present invention to provide a technically and economically efficient process for the recovery of uranium from commercial or "wet-process" phosphoric acid solutions as a purified uranium oxide product. Another object is to provide a liquid-liquid solvent extraction process which will permit the aforementioned objects to be realized.

DESCRIPTION OF THE PREFERRED EMBODIMENT

The present invention is a two-cycle liquid-liquid extraction process in which the uranium, as uranous ion, is extracted with a first-cycle extractant and then oxidatively stripped with a concentrated phosphoric acid solution. This uranium-enriched strip solution then serves as feed for a second liquid-liquid solvent extraction cycle when uranyl ions are extracted into an organic phase, stripped from the organic phase with ammonium carbonate solution, and recovered as a high-grade $U_3O_8$ product.

A detailed description of the process will now be presented as a representative embodiment with reference to the flowsheet of the single FIGURE in which the encircled numerals indicate the designated solution flow rate and the boxed numerals indicate the amount of designated material flow in grams/minute.

The feed solution obtained from the wet-process manufacture is from 5 to 6 M $H_3PO_4$ at a temperature of about 60°C. To insure existence of uranium as uranous ion, the wet-process feed should have a ferrous ion level of 0.5 g/liter or greater.

In the first extraction cycle, the wet-process feed solution containing uranous ion at a temperature in the range 25° to 65° C. is countercurrently contacted with a mixture of mono- and di-(octyl-phenyl) esters of orthophosphoric acids where the octylphenyl group is specifically para(1,1,3,3 tetramethylbutyl). With an extractant concentration of 0.35 M in an inert aliphatic diluent such as Amsco-450, a refined kerosene product obtainable from American Mineral Spirits Company, an extraction coefficient for U(IV) defined as the ratio of uranium concentration in the organic phase to the uranium concentration in the aqueous phase from wet-process acid at 40°C. is about 16, at 50°C, it is 10, and at 60°C it is 7. In general, the rate and cleanness of phase separation increases with temperature while the uranium extraction efficiency decreases. Operation at 40°–45°C. is an optimum range of temperature for conducting first-cycle extraction to achieve good extraction efficiency and phase separation. Phase separation is better when the phases are mixed with the aqueous phase as the continuous phase. While we use the octyl esters of orthophosphoric acid as the extractant in the representative embodiment, the invention is not so limited for it includes within its scope the use of other mixed monoalkyl-dialkyl acid phosphates that extract U(IV) preferentially to U(VI), such as the nonyl, didecyl and tridecyl esters of orthophosphoric acid.

The uranium is stripped from the organic phase by contacting the uranium-loaded extract with 8 to 12 M $H_3PO_4$ containing an oxidizing agent which will oxidize the uranium to the less extractable hexvalent state. A most convenient source of strip solution is the 45–55 percent, approximately 10-M product acid produced by evaporation of wet-process acid as a step in fertilizer production. The oxidizing agent used may be selected from the class which oxidizes the uranium to the hexavalent state. Among the oxidizing agents suitable for this purpose are $Na_2S_2O_8$, $Cl_2$, $O_2$, ozone, and $NaClO_3$. A strip solution containing 2 to 10 grams/liter chlorate ion as sodium chlorate was used and found capable of being loaded with uranium to about 15 g/liter. The uranium-loaded strip solution can now serve as feed, after dilution with water to less than 7 M $H_3PO_4$ but preferably in the range of 5.5 to 6.5 M $H_3PO_4$ to a second extraction cycle using di(2-ethylhexyl) phosphoric acid with a synergistic additive such as trioctylphosphine ocide (TOPO) dissolved in an aliphatic diluent to extract uranium. The uranium-loaded extract is scrubbed with water to remove $H_3PO_4$ and then stripped with a solution of ammonium carbonate to recover the uranium as ammonium uranyl tricarbonate (AUT). The resultant AUT slurry is then filtered, washed with water, and then calcined to yield a refined uranium oxide product. As previously mentioned, the first cycle is a concentration step in which the uranium is concentrated by a factor of 70 to 100 in order to produce a solution that can be economically processed in a small second cycle to produce a pure uranium product.

The effectiveness of the oxidative stripping of the uranium from the first extraction is dramatically shown by the data in the Table below.

TABLE

Organic: 0.32 M octylphenylphosphoric acid in Amsco-450 containing ~1 g U/liter.
Aqueous: 10 M $H_3PO_4$ plus $NaClO_3$ as shown.
Contact: Solutions mixed vigorously for 5 min. at 40°C at an organic-to-aqueous phase ratio of 5 to 1.

| Concentration of $NaClO_3$(g/liter) | Concentration of Uranium (g/liter) | | Uranium Stripping Coefficient ($S_o^a$)* |
|---|---|---|---|
| | Organic | Aqueous | |
| 0 | 0.75 | 1.95 | 2.6 |
| 1 | 0.48 | 2.58 | 5.4 |
| 2 | 0.14 | 4.09 | 29 |
| 4 | 0.06 | 5.99 | 100 |

*$S_o^a$=ratio of U concentration/aqueous/organic

As shown in the Table, at an organic-to-aqueous phase ratio of 5/1 in the absence of an oxidant, the highest loading obtainable from a first-cycle extract containing ~1 g U/liter is about 2 g U/liter. By adding an oxidant, such as $NaClO_3$, the phosphoric acid solution was loaded to 6 g U/liter as the uranium stripping coefficient was increased by a factor of ~40. Thus, it is seen that by appropriate adjustment of the phase ratios and chlorate concentration one can routinely produce strip solutions that contain 15 to 20 g U/liter. These solutions are highly amenable to treatment in a second cycle to produce a purified uranium oxide product.

It will be seen that we have described a process flowsheet which achieves concentration of uranium from a solution containing 0.17 g/l into an oxidation strip solution which can contain from 13 to over 20 grams uranium per liter using a phosphoric acid solution borrowed from the main wet-process acid manufacture. The phosphoric acid strip is efficient, available, cheap, and effective. Unlike other strippants normally used for this purpose such as hydrofluoric acid solutions, the phosphoric acid strip does not hydrolyze the alkylphenyl phosphoric acid extractant, as evidenced by the continued high level of extraction obtained even after several cycles of extraction and stripping.

Having achieved a uranium-enriched strip solution, a second extraction cycle is used from which the uranium can be efficiently stripped into an ammonium carbonate solution from which the uranium can be converted to a purified uranium oxide product.

The uranium concentration level obtainable in the first extraction cycle is particularly advantageous in terms of minimizing the amount of ammonium carbonate needed to strip the uranium from the second cycle. In general, the amount of $(NH_4)_2CO_3$ strippant is inversely proportional to the concentration of uranium dissolved in the di-2ethylhexylphosphoric acid extractant.

The process is easily integrated into and with no disruption in the commercial wet-process scheme. The ready availability of the phosphoric acid to serve as an efficient strip solution for the first extraction cycle is a decided convenient and economical feature of the process.

What is claimed is:

1. A process for the recovery of uranium from a wet-process phosphoric acid solution derived from the acidulation of uraniferous phosphate ores which comprises adjusting said solution with sufficient ferrous ion to insure that the uranium is in the uranous form, contacting the adjusted solution with an organic phase consisting essentially of a mono and disubstituted phenyl ester of orthophosphoric acid dissolved in an inert diluent to effect transfer of the uranium into the organic phase, oxidatively stripping the uranium from the organic phase with a 6-12 M phosphoric acid solution containing a sufficient amount of an oxidizing agent selected from the group consisting of $Na_2S_2O_8$, $O_2$, ozone, and $NaClO_3$ to convert the uranous to uranyl ions, contacting the thus-obtained strip solution with an organic phase containing di(2-ethylhexylphosphoric acid and a synergistic concentration of trioctylphosphine oxide dissolved in an inert organic diluent to effect transfer of the uranyl ions to the organic phase, scrubbing the organic phase with water to remove phosphate ions, stripping the scrubbed organic phase with an ammonium carbonate solution to form a solution or slurry of ammonium uranyl tricarbonate, and then calcining the ammonium uranyl tricarbonate to a purified uranium oxide product.

* * * * *